United States Patent [19]
Gutierrez et al.

[11] Patent Number: 4,906,252
[45] Date of Patent: Mar. 6, 1990

[54] POLYOLEFINIC SUCCINIMIDE POLYAMINE ALKYL ACETOACETATE ADDUCTS AS DISPERSANTS IN FUEL OIL COMPOSITIONS

[75] Inventors: Antonio Gutierrez, Mercerville; Robert D. Lundberg, Bridgewater; Robert A. Kleist, Bayonne; Ricardo Bloch, Scotch Plains, all of N.J.

[73] Assignee: Exxon Chemical Patents Inc., Linden, N.J.

[21] Appl. No.: 334,418

[22] Filed: Apr. 7, 1989

Related U.S. Application Data

[62] Division of Ser. No. 51,273, May 18, 1987, Pat. No. 4,839,071.

[51] Int. Cl.$^4$ .................. C10L 1/18; C07D 207/40
[52] U.S. Cl. ................................. 44/63; 44/71; 548/546; 548/547; 548/548
[58] Field of Search .................. 44/63, 71; 548/546, 548/547, 548

[56] References Cited

U.S. PATENT DOCUMENTS

| | | | |
|---|---|---|---|
| 3,215,707 | 11/1965 | Rense et al. | 260/326.3 |
| 3,280,034 | 10/1966 | Anzenberger et al. | 252/51.5 |
| 3,390,086 | 6/1968 | O'Halloran | 252/47.5 |
| 3,455,831 | 7/1969 | Davis | 252/51.5 |
| 3,455,832 | 7/1969 | Davis | 252/51.5 |
| 3,888,773 | 6/1975 | Nnadi et al. | 252/51.5 A |
| 3,927,041 | 12/1975 | Cengel et al. | 260/346.8 |
| 4,062,786 | 12/1977 | Brois et al. | 252/51.5 |
| 4,113,639 | 9/1978 | Lonstrup et al. | 252/51.5 |
| 4,116,876 | 9/1978 | Brois et al. | 252/49.6 |
| 4,123,373 | 10/1978 | Brois et al. | 252/48.6 |
| 4,160,648 | 7/1979 | Lewis et al. | 44/63 |
| 4,234,435 | 11/1980 | Meinhardt et al. | 252/51.5 |
| 4,274,837 | 6/1981 | Lilburn | 44/63 |
| 4,375,974 | 3/1983 | Maldonado et al. | 252/51.5 A |
| 4,447,348 | 5/1984 | Forsberg | 252/51.5 A |
| 4,521,318 | 6/1985 | Karol | 252/51.5 A |
| 4,548,724 | 10/1985 | Karol et al. | 252/51.5 |
| 4,568,358 | 2/1986 | Courtney | 44/63 |
| 4,579,675 | 4/1986 | Sawicki et al. | 252/51.5 |
| 4,612,132 | 9/1986 | Wollenberg et al. | 252/51.5 A |
| 4,614,603 | 9/1986 | Wollenberg | 252/51.5 A |
| 4,645,515 | 2/1987 | Wollenberg | 44/63 |
| 4,648,886 | 3/1987 | Buckley, III et al. | 44/63 |
| 4,666,459 | 5/1987 | Wollenberg | 44/63 |
| 4,666,460 | 5/1987 | Wollenberg | 44/63 |
| 4,668,246 | 5/1987 | Wollenberg | 44/63 |
| 4,778,481 | 10/1988 | Courtney | 44/63 |
| 4,780,111 | 10/1988 | Dorer et al. | 44/63 |
| 4,798,612 | 1/1989 | Plavac et al. | 44/63 |
| 4,839,070 | 6/1989 | Gutierrez et al. | 252/51.5 A |
| 4,839,071 | 6/1989 | Gutierrez et al. | 252/51.5 A |
| 4,839,072 | 6/1989 | Gutierrez et al. | 252/51.5 A |
| 4,839,073 | 6/1989 | Gutierrez et al. | 252/51.5 A |

OTHER PUBLICATIONS

Smalheer et al., "Lubricant Additives" 1967.
G. O. Torosyan et al., *Institute of Organic Chemistry, Academy of Sciences of the Armenian SSR*, Translated from Zhurnal Organischeskoi Khimmi, vol. 18, "Amines and Ammonium Compounds, CLX, Amides of Acetoacetic Acid", pp. 1229-1231.

Primary Examiner—William R. Dixon, Jr.
Assistant Examiner—E. McAvoy
Attorney, Agent, or Firm—J. B. Murray, Jr.

[57] ABSTRACT

This invention is to a fuel oil composition containing polyolefinic succinimide polyamine alkyl acetoacetate adducts of the general following:

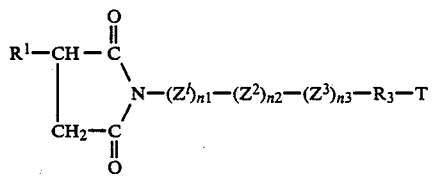

wherein the variables are defined herein. The adduct additives are especially useful in concentrates and fuel oil compositions as dispersants. The formulations have excellent cold flow properties compared to similar formulations not containing the inventive adduct.

46 Claims, No Drawings

POLYOLEFINIC SUCCINIMIDE POLYAMINE ALKYL ACETOACETATE ADDUCTS AS DISPERSANTS IN FUEL OIL COMPOSITIONS

CROSS-REFERENCE TO RELATED APPLICATIONS

This application is a Division of Ser. No. 051,273, filed May 18, 1987, now U.S. Pat. No. 1,839,071, and is related to Attorney's Docket No. PT-726, "Polyolefinic Succinimide Polyamine Alkyl Acetoacetate and Substituted Acetate Adducts As Compatibilizer Additives In Fuel Oil Compositions", filed on even data herewith. This application is also related to Ser. Nos. 051,146, Pat. No. 4,839,070, 051,275, 4,839,073, and 051,276, 4,839,072, all filed on May 18, 1987.

FIELD OF THE INVENTION

This invention is to fuel oil and concentrate compositions containing polyolefinic succinimide polyamine alkyl acetoacetate adduct dispersants of the general formula:

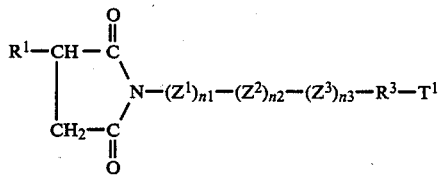

wherein $Z^1$ and $Z^3$ are the same or different and are moieties of the formula:

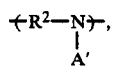

$Z^2$ is a moiety of the formula:

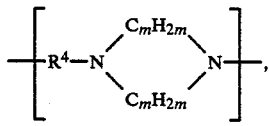

wherein $R^2$, $R^3$ and $R^4$ are the same or different and are alkylene of from 1 to 6 carbon atoms, m is an integer of from 1 to 5, each A' is independently selected from the group consisting of H, A and the moiety:

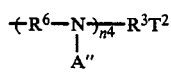

wherein A" is H or A, $R^3$ is as defined above, $R^6$ is alkylene of from 1 to 6 carbon atoms, $T^1$ and $T^2$ are the same or different and each comprises a member selected from the group consisting of moieties of the formula:

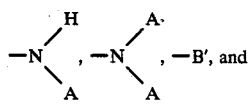

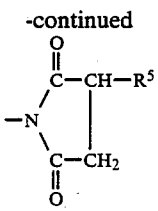

wherein B' is substituted or unsubstituted alkyl or aryl-containing group, $n^1$ is an integer of 0 to 10, $n^2$ is an integer of 0 to 10, $n^3$ is an integer of from 0 to 10, $n^4$ is an integer of from 0 to 10, with the provisos that the sum of $n^1$, $n^2$, $n^3$ and $n^4$ is from 3 to 10 and the sum of $n^1$, $n^3$ and $n^4$ is at least 1, wherein $R^1$ and $R^5$ are independently an olefin polymer having a number average molecular weight ($\overline{M}_n$) between about 650 and 3,500, and wherein A comprises a tautomeric substituent of the formula:

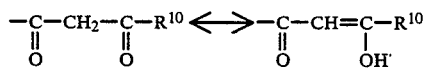

wherein $R^{10}$ is substituted or unsubstituted alkyl or aryl containing groups, with the proviso that at least one of the A' or A" groups comprises said substituted acetyl or said tautomeric substituent, wherein at least about 95% of $T^1$ and $T^2$ groups in adduct dispersants comprise said succinimide moiety of the formula:

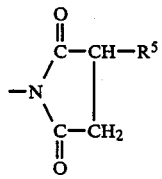

wherein $R^5$ is as defined above.

The adduct additives are especially useful in lubricating oil or fuel oil compositions or in the additive concentrates used in making up those compositions. They are excellent dispersants when used in those compositions and provide superior low temperature fluid flow properties to those compositions.

BACKGROUND OF THE INVENTION

Polyalkene substituted carboxylic acids are widely known and used as additives in lubricating oils.

Illustrations of such materials are shown in numerous patents.

U.S. Pat. No. 3,215,707 discloses the reaction of chlorine with a mixture of polyolefin, having molecular weights up to about 50,000, and maleic anhydride.

U.S. Pat. No. 3,927,041 discloses the reaction of 300 to 3,000 molecular weight polybutene with a dicarboxylic acid or anhydride to form materials which can be used per se, or as esters, amides, imides, amidines, or the like in petroleum products.

U.S. Pat. No. 4,062,786 provides an example (No. 13) of polyisobutylene succinic anhydride having a molecular weight of about 1300, a saponification number of about 100, and about 1.25 succinic anhydride units per polyisobutylene unit.

U.S. Pat. No. 4,123,373 shows a similar material having a molecular weight of about 1400, a saponification number of 80, and about 1.07 succinic anhydride units per polyisobutylene unit.

U.S. Pat. No. 4,234,435 also shows polyalkene substituted dicarboxylic acids derived from polyalkenes having an average molecular weight of 1300 to 5000.

Polyalkenyl succinic anhydrides have also been reacted with polyamines to form materials suitable for use as dispersants in lubricating oils.

U.S. Pat. No. 4,113,639 and 4,116,876 provides an example of alkenyl succinic anhydride in which the molecular weight of the alkenyl unit is about 1300, a saponification number of 103, and about 1.3 succinic anhydride units per hydrocarbon molecule. The material is then reacted with a polyamine and boric acid ('639) or with an amino alcohol and boric acid ('876).

U.S. Pat. No. 4,548,724 teaches a lubricating oil additive comprising the reaction product of a polycarboxylic acid, e.g., 1,3,6-hexane carboxylic acid, with a polyisobutylene succinimide and a polyamine.

U.S. Pat. No. 4,579,675 relates to the reaction products of polyalkylene succinimides (derived from polyethylene-polyamines) and 1,3-dicarbonyl compounds. However, the reaction temperatures are such that the products are materials known as N-substituted enaminones. Therefore, polyisobutenyl succinimide, derived from polyisobutenyl succinic anhydride and diethylene triamine, was reacted with ethyl acetoacetate at 110° C. to form the corresponding N-substituted enaminone. The reaction is carried out in the presence of an alkylsulfonic acid to favor the formation of what appears to be a kinetically preferred product, the enaminone. The adduct of the present invention furthermore has, as its by-product, an alcohol or mercaptan rather than the by-product water of the '675 product. The enaminone reaction products are said to have detergent/dispersant properties when included in a lubricating oil composition.

No known disclosure suggests either the products disclosed herein or the use of these inventive adducts as dispersants.

SUMMARY OF THE INVENTION

This invention is to hydrocarbon containing oleaginous compositions polyolefinic succinimide polyamine alkyl acetoacetate adducts of the general formula:

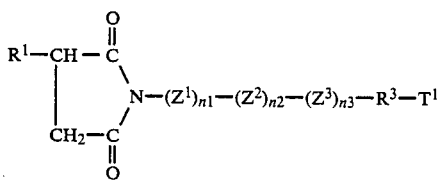

wherein $Z^1$ and $Z^3$ are the same or different and are moieties of the formula:

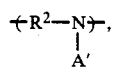

$Z^2$ is a moiety of the formula:

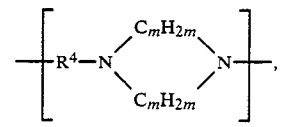

wherein $R^2$, $R^3$ and $R^4$ are the same or different and are alkylene of from 1 to 6 carbon atoms, m is an integer of from 1 to 5, each A' is independently selected from the group consisting of H, A and the moiety:

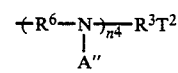

wherein A" is H or A, $R^3$ is as defined above, $R^6$ is alkylene of from 1 to 6 carbon atoms, $T^1$ and $T^2$ are the same or different and each comprises a member selected from the group consisting of moieties of the formula:

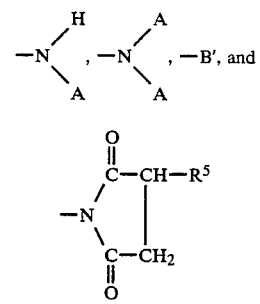

wherein B' is substituted or unsubstituted alkyl or aryl-containing group, $n^1$ is an integer of 0 to 10, $n^2$ is an integer of 0 to 10, $n^3$ is an integer of from 0 to 10, $n^4$ is an integer of from 0 to 10, with the provisos that the sum of $n^1$, $n^2$, $n^3$ and $n^4$ is from 3 to 10 and the sum of $n^1$, $n^3$ and $n^4$ is at least 1, wherein $R^1$ and $R^5$ are independently an olefin polymer having a number average molecular weight (ovs/$M_n$) between about 650 and 3,500, and wherein A comprises a tautomeric substituent of the formula:

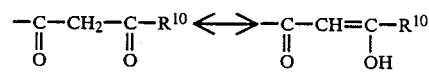

wherein $R^{10}$ is substituted or unsubstituted alkyl or aryl containing groups, with the proviso that at least one of the A' or A" groups comprises said substituted acetyl or said tautomeric substituent, wherein at least about 95% of $T^1$ and $T^2$ groups in adduct dispersants comprise said succinimide moiety of the formula:

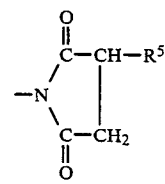

wherein $R^5$ is as defined above.

Also included in the invention are compositions containing mixtures of adducts fitting the above description, particularly adducts in which the mixtures contain adducts in which the $T^1$ and/or $T^2$ substituents are both the amide and the succinimide. However, the mixtures must contain a substantial majority of the bis-succinimide form.

The compositions containing these adducts are useful as lubricating or fuel compositions. The compositions may also contain other (or auxiliary) high molecular weight dispersants, high total base number detergents and antiwear agents or antioxidants. The adducts provide superb dispersancy in the compositions and, when used in lubricating oil compositions, also give the added benefit of superior cold flow properties.

DETAILED DESCRIPTION OF THE INVENTION

Lubricating oil compositions, e.g., automatic transmission fluids, heavy duty oils suitable for gasoline and diesel engines, etc., can be prepared using the compositions of this invention. Universal type crankcase oils, those in which the same lubricating oil composition is used for either gasoline or diesel engines, may also be prepared. These lubricating oil formulations conventionally contain several different types of additives that supply the characteristics that are required for the particular use. Among these additives are included viscosity index improvers, antioxidants, corrosion inhibitors, detergents, dispersants, pour point depressants, antiwear agents, etc.

The dispersants used in lubricating oil compositions have the primary function of dispersing particulate materials formed in the engine and keeping those materials in dispersion. As a rule of thumb, the dispersants having the higher molecular weight have higher efficiency in maintaining particulates in dispersion than those with lower molecular weight. Higher molecular weight, however, often causes increased viscosity in the finished formulation. This result may be a benefit in that high temperature lubricating properties are maintained. Increased viscosity may, however, cause increased pumping losses in an engine and result in lower gas mileage. Increased viscosity at low temperature may also cause substantial problems in attempting to start engines during the winter. Compositions containing the inventive adduct show excellent dispersant capabilities and yet provide superior cold start operation.

In the preparation of lubricating oil formulations, it is common practice to introduce the additives in the form of a concentrate (for instance, as an "ad pack") containing 10 to 80 weight percent, e.g., 20 to 80 weight percent, active ingredients in a solvent. The solvent may be a hydrocarbon oil, e.g., a mineral lubricating oil, or other suitable material. In forming finished lubricants, such as crankcase motor oils, these concentrates, in turn, may be diluted with 3 to 100, e.g., 5 to 40, parts by weight of lubricating oil per part by weight of the additive package. One uses concentrates, of course, to make the handling of the various constituent materials less difficult as well as to facilitate solution or dispersion of those materials in the final blend. The inventive adducts may be used in concentrates containing other additives suitable for formulating finished lubricating oil formulations.

THE COMPOSITIONS

Oleaginous compositions made according to this invention generally will contain at least:
a. a lubricating or fuel oil, and,
b. polyolefinic succinimide polyamine alkyl acetoacetate dispersant adducts of this invention.

The dispersants of this invention are oil-soluble, dissolvable in oil with the aid of a suitable solvent, or are stably dispersible materials. Oil-soluble, dissolvable, or stably dispersible as that terminology is used herein does not necessarily indicate that the materials are soluble, dissolvable, miscible, or capable of being suspended in oil in all proportions. It does mean, however, that the dispersant additives, for instance, are soluble or stably dispersible in oil to an extent sufficient to exert their intended effect in the environment in which the oil is employed. Moreover, the additional incorporation of other additives may also permit incorporation of higher levels of a particular dispersant, if desired.

Accordingly, while any effective amount of the dispersant additives can be incorporated into the lubricating oil composition, it is contemplated that such effective amount be sufficient to provide said lube oil composition with an amount of the additive of typically from about 0.10 to about 15 e.g., 0.1 to 10, and preferably from about 0.1 to about 7 wt. %, based on the weight of said composition.

The dispersant additives of the present invention can be incorporated into the lubricating oil in any convenient way. Thus, they can be added directly to the oil by dispersing, or dissolving the same in the oil at the desired level of concentration typically with the aid of a suitable solvent such as toluene, or tetrahydrofuran. Such blending can occur at room temperature or elevated temperatures. Alternatively, the dispersant additives may be blended with a suitable oil-soluble solvent and base oil to form a concentrate, and then blending the concentrate with lubricating oil base stock to obtain the final formulation. Concentrates will typically contain from about 20 to about 60 wt. %, by weight dispersant additive, and typically from about 80 to about 20%, preferably from about 60 to about 20% by weight base oil, based on the concentrate weight.

The dispersant of this invention can be employed as additive concentrates comprising concentrated solutions or dispersions of the dispersant (in concentrate amounts hereinabove described), together with one or more of said other additives (said concentrate when constituting an additive mixture being referred to herein as an additive-package) whereby several additives can be added simultaneously to the base oil to form the lubricating oil composition. Dissolution of the additive concentrate into the lubricating oil may be facilitated by solvents and by mixing accompanied with mild heating, but this is not essential. The concentrate or additive-package will typically be formulated to contain the dispersant additive and optional additional additives in proper amounts to provide the desired concentration in the final formulation when the additive-package is combined with a predetermined amount of base lubricant. Thus, the dispersant of the present invention can be added to small amounts of base oil or other compatible solvents along with other desirable additives to form additive-packages containing active ingredients in collective amounts of typically from about 2.5 to about 90%, and preferably from about 5 to about 75%, and most preferably from about 8 to about 50% by weight additives in the appropriate proportions with the remainder being base oil.

The final formulations may employ typically about 10 wt. % of the additive-package with the remainder being base oil.

All of said weight percents expressed herein are based on active ingredient (A.I.) content of the additive, and/or upon the total weight of any additive-package, or formulation which will be the sum of the A.I. weight of each additive plus the weight of the total oil or diluent.

Depending upon the use to which the compositions are ultimately placed, the compositions may also include auxiliary dispersants, detergents/rust inhibitors, antiwear additives, antioxidants, friction modifiers, pour point depressants, viscosity index improvers and the like.

The compositions of this mixture contain at least the inventive dispersant in an amount effective to provide its dispersant functions.

Compositions may be blended containing the following additives in amounts effective to provide their normal attendant functions. These additive effective amounts are illustrated as follows:

| Additive | Wt. % a.i. (Broad) | Weight % a.i. (Preferred) |
|---|---|---|
| Viscosity Modifier | 0.01–12 | 0.1–16 |
| Corrosion Inhibitor | 0.01–5 | 0.01–1.5 |
| Oxidation Inhibitor | 0.01–5 | 0.01–1.5 |
| Dispersants (Total) | 0.1–20 | 0.1–14 |
| Pour Point Depressant | 0.01–5 | 0.01–1.5 |
| Antifoaming Agents | 0.001–3 | 0.001–0.15 |
| Antiwear Agents | 0.001–5 | 0.001–1.5 |
| Friction Modifiers | 0.01–5 | 0.01–1.5 |
| Detergent/Rust Inhibitors | 0.01–20 | 0.01–1.5 |
| Mineral Oil Base | Balance | Balance |

When the compositions of the invention are used in the form of lubricating oil compositions, such as automotive crankcase lubricating oil compositions, a major amount of a lubricating oil may be included in the composition. Broadly, the composition may contain about 85 to about 99.9 weight percent of a lubricating oil. Preferably, about 93 to about 99.8 weight percent of the lubricating oil. The term "lubricating oil" is intended to include not only hydrocarbon oils derived from petroleum but also synthetic oils such as alkyl esters of dicarboxylic acids, polyglycols and alcohols, polyalphaolefins, alkyl benzenes, organic esters of phosphoric acids, polysilicone oils, etc.

When the compositions of this invention are provided in the form of concentrates, with or without other additives, a minor amount, e.g., up to about 50 percent by weight, of a solvent, mineral or synthetic oil may be included to enhance the handling properties of the concentrate.

When the compositions are used as normally liquid petroleum fuels such as gasoline, and middle distillates boiling from about 66° to 430° C., including kerosene, diesel fuels, home heating fuel oil, jet fuels, etc., a concentration of the additive in the fuel in the range of 0.001 to 0.5, preferably about 0.001 to 0.1 weight percent, based on the weight of the total composition, will usually be employed.

DISPERSANTS

As has been noted before, this invention is to compositions containing, as dispersants, polyolefinic succinimide polyamine alkyl acetoacetate adducts of the general formula (I):

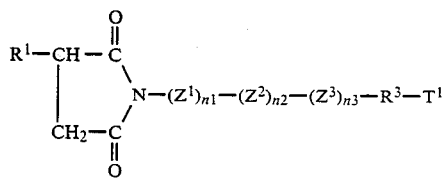

wherein $Z^1$ and $Z^3$ are the same or different and are moieties of the formula:

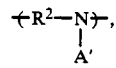

$Z^2$ is a moiety of the formula:

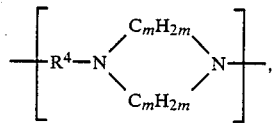

wherein $R^2$, $R^3$ and $R^4$ are the same or different and are alkylene of from 1 to 6 carbon atoms, m is an integer of from 1 to 5, each $A'$ is independently selected from the group consisting of H, A and the moiety:

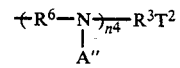

wherein $A''$ is H or A, $R^3$ is defined above, $R^6$ is alkylene of from 1 to 6 carbon atoms, $T^1$ and $T^2$ are the same or different and each comprises a member selected from the group consisting of moieties of the formula:

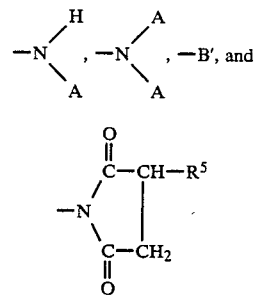

wherein $B'$ is substituted or unsubstituted alkyl or aryl-containing group, $n^1$ is an integer of 0 to 10, $n^2$ is an integer of 0 to 10, $n^3$ is an integer of from 0 to 10, $n^4$ is an integer of from 0 to 10, with the provisos that the sum of $n^1$, $n^2$, $n^3$ and $n^4$ is from 3 to 10 and the sum of $n^1$, $n^3$ and $n^4$ are at least 1, wherein $R^1$ and $R^5$ are independently an olefin polymer having a number average molecular weight (ovs/$\overline{M}_n$) between about 650 and 3,500, and wherein A comprises a tautomeric substituent of the formula (Ia):

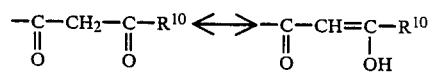

wherein $R^{10}$ is substituted or unsubstituted alkyl or aryl containing groups, with the proviso that at least one of the A' or A" groups comprises said tautomeric substituent, wherein at least about 95% of $T^1$ and $T^2$ groups in adduct dispersants comprise said succinimide moiety of the formula (Ib):

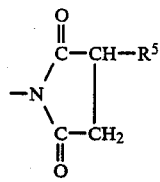

wherein $R^5$ is as defined above.

The $R^1$ and $R^5$ groups may be the same or different and may be H or olefinic polymeric residues produced from $C_2$ to $C_{10}$ monoolefins. Such olefins may be ethylene, propylene, butylene, isobutylene, pentene, octene-1, styrene, etc. The polymers may be homopolymers such as polyisobutylene, as well as copolymers of two or more of such olefins such as copolymers of: ethylene and propylene; butylene and isobutylene; propylene and isobutylene; etc., other copolymers are those in which a minor molar amount of the copolymer monomers, e.g., 1 to 10 mole percent, is a $C_4$ to $C_{18}$ diolefin, e.g., a copolymer of isobutylene and butadiene; or a copolymer of ethylene, propylene and 1,4-hexadiene; etc.

The olefin polymer may be completely saturated as in the example of an ethylene-propylene copolymer made by Ziegler-Natta synthesis using hydrogen as a moderator to control molecular weight.

The olefinic polymer will usually have number average molecular weights within the range of about 650 and about 3500, more usually between about 800 and about 3000. Particularly useful olefin polymers have number average molecular weights within the range of about 900 and about 2,300 with approximately one double bond per polymer chain. An especially useful starting material is polyisobutylene.

The $R^2$, $R^4$ and $R^6$ groups are alkyl linkages having from 1 to 6 carbon atoms. The preferred linkage is a $C_2$ to $C_4$ link (e.g., $-CH_2-$, $-C_2H_4-$, $-C_3H_6-$, and $-C_4H_8-$). Most preferred is an ethylene linkage.

Preferably, when $n^2$ is zero, the value of $n^1$ is from 1 to 5, $n^3$ is from 0 to 5, and $n^4$ is from 0 to 5, and the sum of integers $n^1$, $n^3$ and $n^4$ is preferably from 2 to 10, and more preferably from 3 to 7. When $n^2$ is not zero, preferably each $A^1$ is independently selected from H or A, and the value of $n^1$ is from 1 to 5, $n^2$ is from 1 to 3, $n^3$ is from 0 to 5, and the total of integers $n^1$, $n^2$ and $n^3$ is from 2 to 10, and more preferably from 3 to 7.

The $R^{10}$ group may be a substituted or unsubstituted alkyl or aryl-containing group but desirably is a lower alkyl having 1 to 4 carbon atoms and preferably is a methyl group.

As noted above, $T^1$ and $T^2$ may be either secondary or tertiary amide groups of the formula:

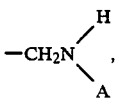

or

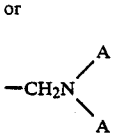

or polyolefin substituted succinimide-containing groups of the formula (Ib):

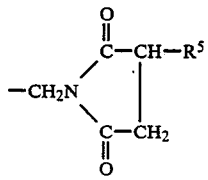

Mixtures of adducts fitting the above description comprise adducts wherein at least about 95%, more preferably at least about 99%, and most preferably at least about 99.5%, of the $T^1$ and $T^2$ groups comprise the above polyolefin substituted succinimide-containing groups (Ib).

Exemplary of adducts of this invention derived from cyclic alkylene polyamines are adducts of the formula I wherein $N^1$, $n^2$ and $n^3$ are each integers of 1 to 3, $R^2$ and $R^4$ are each $C_2$ to $C_4$ alkylene, A' is A, $n^4$ is an integer of 1 to 3, $R^3$ is $-CH_2CH_2-$, $T^1$ is

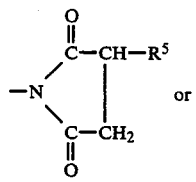

$-NH(A)$, A is the tautomeric substituent of the formula Ia wherein $R^{10}$ is $C_1$ to $C_2$ alkyl, and wherein $R^1$ and $R^5$ are the same or different and are polyalkylene (especially, polyisobutylene or polybutylene) having $\overline{M}_n$ of from 1,500 to 3,000. Illustrative such adducts are those of the formula (III):

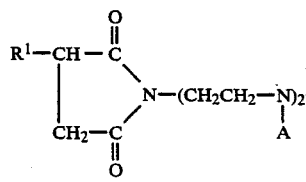 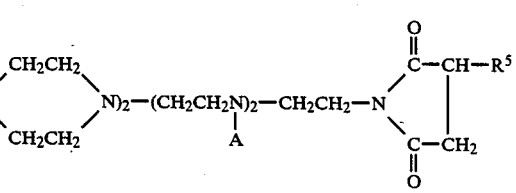

wherein $R^1$, $R^5$ and A are as defined in the prior sentence.

Exemplary of adducts of this invention derived from straight and branched chain polyalkylene polyamines are adducts of formula I wherein $n^2$ is zero, $n^1$ and $n^3$ are each integers of from 1 to 3, $R^2$ is $C_2$ and $C_4$ alkylene, each A' is:

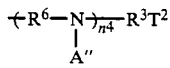

$R^3$ is —CH$_2$CH$_2$—, $n^4$ is an integer of 1 to 3, $R^6$ is C$_2$ to C$_4$ alkylene, T$^1$ and T$^2$ are as defined in formula I, A is the tautomeric substituent of formula (Ib) wherein R$^{10}$ is C$_1$ to C$_2$ alkyl, and R$^1$ and R$^5$ are the same or different and are polyalkylene having $\overline{M}_n$ of from 1,500 to 3,000. Exemplary of adducts derived from such branched chain polyalkylene polyamines are adducts of the formula (IV):

Exemplary of preferred compatibilizer adducts of this invention are:

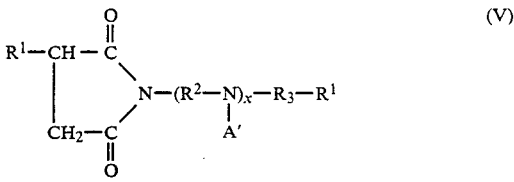

wherein A' is A, and wherein R$^1$, R$^2$, R$^3$, and T$^1$ as defined in Table I below:

TABLE I

| R$^1$ | x | R$^2$ | R$^3$ | R$^{10}$ of Each A(1) | T$^1$ |
|---|---|---|---|---|---|
| Derived from: | | | | | |
| polyisobutylene $\overline{M}_n = 700$ | 5 | —C$_2$H$_4$— | —CH$_2$CH$_2$— | —CH$_3$ | —NH(A), R$^{10}$ = —CH$_3$ |
| polyisobutylene $\overline{M}_n = 2,200$ | 3 | —CH$_2$— | —C$_3$H$_6$— | —C$_2$H$_5$ | —NH(A), R$^{10}$ = —CH$_3$ |
| polybutene $\overline{M}_n = 1,200$ | 4 | —C$_5$H$_{10}$— | —C$_4$H$_8$— | —H | —NH(A)$_2$, R$^{10}$ = —H |
| polybutene $\overline{M}_n = 4,000$ | 2 | —C$_2$H$_4$— | —C$_2$H$_4$— | —C$_2$H$_5$ | —NH(A)$_2$, R$^{10}$ = —C$_2$H$_5$ |
| polypentene $\overline{M}_n = 1,800$ | 5 | —C$_3$H$_6$— | —C$_3$H$_6$— | —C$_4$H$_9$ | —N(A)$_2$, R$^{10}$ = —C$_4$H$_9$ |
| ethylene-propylene co-polymer $\overline{M}_n = 3,000$ | 2 | —C$_2$H$_4$— | —C$_2$H$_4$— | —CH$_3$ | 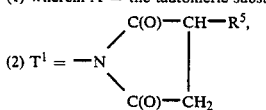 R$^{10}$ = —CH$_3$ |
| polyisobutylene $\overline{M}_n = 1,500$ | 2 | —C$_2$H$_4$— | —C$_2$H$_4$— | —CH$_3$ | (2) |

Notes:
(1) wherein A = the tautomeric substituent of formula Ia.

(2) T$^1$ = 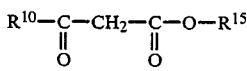

wherein R$^5$ = polyisobutylene, $\overline{M}_n = 1,500$

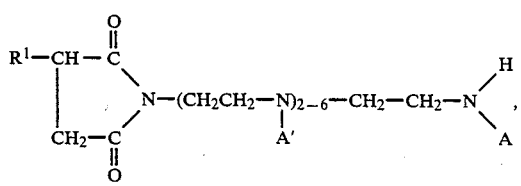

wherein A' is:

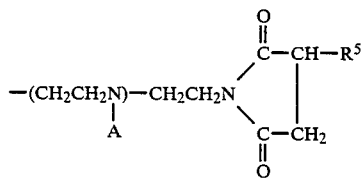

wherein R$^1$, A and R$^5$ are as defined in the prior sentence. Exemplary of adducts derived from straight chain polyalkylene polyamines are adducts of formula (IV) wherein A' is H or A.

Adducts of this invention derived from straight chain polyalkylene polyamines are preferred.

These adducts may be made in a variety of ways. Certain portions of the reaction scheme are believed to be important in producing the described molecule. Those steps will be highlighted at appropriate junctures.

The step in this process which produces the adducts of this invention is the reaction of an alkyl acetoacetate of the formula (VI):

$$R^{10}-\underset{\underset{O}{\|}}{C}-CH_2-\underset{\underset{O}{\|}}{C}-O-R^{15}$$

or the alkyl thioacetate of the formula (VII):

$$R^{10}-\underset{\underset{O}{\|}}{C}-CH_2-\underset{\underset{O}{\|}}{C}-S-R^{15}$$

(wherein R$^{10}$ is as defined above and R$^{15}$ may be H or substituted or unsubstituted alkyl or aryl but is preferably a C$_1$ to C$_6$ alkyl) with a long chain polyolefinic dicarboxylic acid which has been aminated with a polyamine, such as the saturated aliphatic amines, alicyclic diamines, and polyoxyalkylenes of formulae (XIII)–(XVIII) discussed below. Preferred are polyalkylene polyamines of from 5 to 9 carbon atoms, e.g., tetraethylene pentamine. This reaction should be practiced at a temperature sufficiently high to produce substantial amounts of the tautomeric keto-enol rather than the enaminone. Generally, temperatures of from 120° to 220° C. will be suitable, with 150° to 180° C. being preferred. Temperatures of at least about 150° C. typically meet this goal although proper choice of temperature depends on many factors, including reactants, concentration, reaction solvent choice, etc. The reaction of the animated polyolefinic dicarboxylic acid material and the alkyl acetonate and the alkyl thioacetate will liberate the corresponding $HOR^{15}$ and $HSR^{15}$ by-products, respectively. Preferably, such by-products are substantially removed, as by distillation or stripping with an inert gas (such as $N_2$), prior to use of the adduct as described herein. Such distillation and stripping steps are conveniently performed at elevated temperature, e.g., at the selected reaction temperature (for example, at 150° C. or higher).

The amount of alkyl aceto-acetate and/or alkyl thioacetate reactants used can vary widely, and is preferably selected so as to avoid substantial excesses of these reactants. Generally, these reactants are used in a reactant:amine nitrogen-equivalent molar ratio of from about 0.1 to 1:1, and preferably from about 0.5 to 1:1, wherein the moles of amine nitrogen-equivalent is the moles of secondary nitrogens plus twice the moles of primary nitrogens in the animated polyolefinic dicarboxylic acid material (e.g., PIBSA-PAM) which is thus contacted with the alkyl acetonate or alkyl thioacetate. The reaction should also be conducted in the substantial absence of strong acids (e.g., mineral acids, such as HCl, $HB_2$, $H_2SO_4$, $H_3PO_3$ and the like, and sulfonic acids, such as para-toluene sulfonic acids) to avoid the undesired side-reactions and decrease in yield to the adducts of this invention.

Methods for producing the long chain polyolefinic dicarboxylic acid substrate and the subsequent amination are known and are discussed below in the section discussing Auxiliary Dispersants.

Such long chain polyolefinic dicarboxylic acid substrates can be illustrated by compounds of the formula:

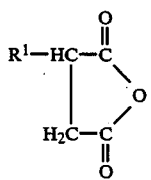

(VIII)

wherein $R^1$ is as defined above, or the corresponding diacid:

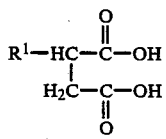

(IX)

wherein $R^1$ is as defined above, or mixtures thereof.

Exemplary of amines employed are members selected from the group consisting of compounds of the formula:

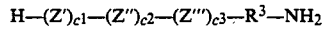

wherein Z' and Z" are the same or different and are moieties of the formula:

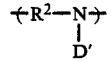

Z" is a moiety of the formula:

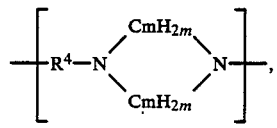

wherein $R^2$, $R^3$ and $R^4$ are the same or different and are alkylidene of from 1 to 6 carbon atoms, m is an integer of from 1 to 5, each D' is independently selected from the group consisting of H and the moiety

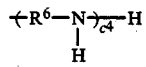

wherein $R^6$ is alkylene of from 1 to 6 carbon atoms, $c^1$ is an integer of 0 to 10, $c^2$ is an integer of 0 to 10, $c^3$ is an integer of from 0 to 10, $c^4$ is an integer of from 0 to 10, with the provisos that the sum of $c^1$, $c^2$, $c^3$ and $c^4$ is from 3 to 10 and the sum of $c^1$, $c^3$ and $c^4$ is at least 1.

The resulting animated polyolefinic dicarboxylic acid substrate materials can be generically illustrated by compounds of the formula (X):

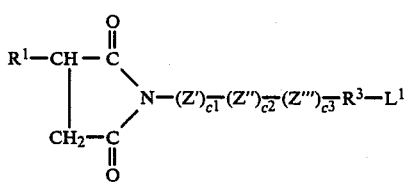

wherein Z' and Z''' are the same or different and are moieties of the formula:

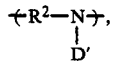

Z" is a moiety of the formula:

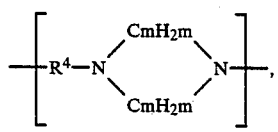

wherein $R^2$, $R^3$ and $R^4$ are the same or different and are alkylene of from 1 to 6 carbon atoms, m is an integer of from 1 to 5, each D' is independently selected from the group consisting of H and the moiety:

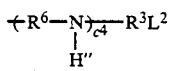

wherein $R^3$ is as defined above, $R^6$ is alkylene of from 1 to 6 carbon atoms, $L^1$ and $L^2$ are the same or different and each comprises a member selected from the group consisting of moieties of the formula:

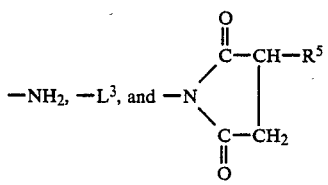

wherein $L^3$ is substituted or unsubstituted alkyl or aryl-containing group, $c^1$ is an integer of from 0 to 10, $c^2$ is an integer of from 0 to 10, $c^3$ is an integer of from 0 to 10, $c^4$ is an integer of from 0 to 10, with the provisos that the sum of $c^1$, $c^2$, $c^3$ and $c^4$ is from 3 to 10 and the sum of $c^1$, $c^3$ and $c^4$ is at least one.

The resulting animated polyolefinic dicarboxylic acid substrate materials prepared from polyalkylene polyamines can be illustrated by the general formulae:

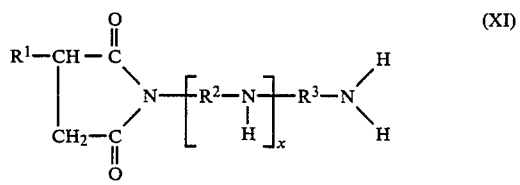

or

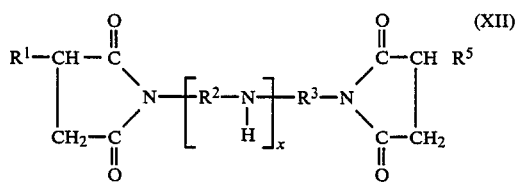

wherein x is an integer of from 1 to 10.

Typically, they will be produced in mixtures of the two.

The polyolefinic dicarboxylic acid substrate material after animation, is then reacted with an alkyl acetoacetate or with an alkyl thioacetate as described above.

An alternative method of synthesizing the inventive adduct is one in which, in a first step, the above-noted amine compounds are first reacted with the listed alkyl acetoacetates or alkyl thioacetate. The resulting material, in a second step, may then be reacted with the polyolefinic dicarboxylic acid material. The first step may be done by simply mixing the reactant amines and alkyl acetoacetates at a temperature of from about 120° to 220° C., preferably at least about 150° C., more preferably 150° C. to 180° C. to form an amino compound substituted by at least one tautomeric substituent of the formula (Ia):

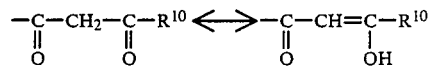

wherein $R^{10}$ is as defined above.

A neutral diluent such as mineral oil may be used but is not needed. The second step desirably takes place in a neutral diluent such as a mineral oil at a temperature between 100° C. and 230° C. The temperature is not particularly critical but takes place at a higher rate at the higher temperature range, e.g., at least about 150° C. As in the first above-mentioned method, it is preferable to distill and/or use inert gas stripping (e.g., with $N_2$), at elevated temperatures, to substantially remove by-product $HOR^{15}$ or $HSR^{15}$ from the amine-alkyl acetoacetate (or alkyl thioacetate) reaction mixture, and the reaction should be conducted in the substantial absence of strong acids.

The adducts of this invention may be treated by boration as generally taught in U.S. Pat. Nos. 3,087,936 and 3,254,024 (which are incorporated by reference). This is accomplished by treating the adduct with a boron compound selected from boron oxide, boron halides, boron acids, and esters of boron acids in an amount sufficient to provide from about 0.1 to about 20 atomic proportion of boron for each mole of adduct. Desirably those proportions will be from 0.05 to 2.0 weight percent, e.g., 0.05 to 0.7 weight percent, boron based or the total weight of the adduct.

Treating may be carried out by adding from about 0.05 to 4 weight percent of the boron compound (preferably boric acid) to the adduct and heating while stirring between 135° C. to 190° C. The time of reaction may be 1 to 5 hours. Nitrogen stripping may be used during or after the reaction.

THE AUXILIARY DISPERSANT

The auxiliary dispersants which may optionally be included in this inventive composition comprise nitrogen or ester containing dispersants selected from the group consisting of (i) oil soluble salts, amides, imides, oxazolines and esters, or mixtures thereof, of long chain hydrocarbon substituted mono and dicarboxylic acids or their anhydrides; (ii) long chain aliphatic hydrocarbon having a polyamine attached directly thereto; and (iii) Mannich condensation products formed by condensing about a molar proportion of a long chain substituted phenol with about 1 to 2.5 moles of formaldehyde and about 0.5 to 2 moles of polyalkylene polyamine; wherein said long chain hydrocarbon group in (i), (ii) and (iii) is a polymer of a $C_2$ to $C_{10}$, e.g., $C_2$ to $C_5$, mono-olefin, said polymer having a number average molecular weight of about 300 to 5000.

A(i) The long chain hydrocarbyl substituted mono- or dicarboxylic acid material, i.e. acid, anhydride, or ester, used in the invention includes long chain hydrocarbon, generally a polyolefin, substituted with an average of at least about 0.8, generally from about 1.0 to 2.0, preferably 1.05 to 1.4, more preferably 1.1 to 1.30, per mole of polyolefin, of an alpha or beta unsaturated $C_4$ to $C_{10}$ dicarboxylic acid, or anhydride or ester thereof, such as fumaric acid, itaconic acid, maleic acid, maleic anhydride, chloromaleic acid, dimethyl fumarate, chloromaleic anhydride, acrylic acid, methacrylic acid, crotonic acid, cinnamic acid, and mixtures thereof.

The preferred auxiliary dispersants are long chain hydrocarbyl substituted dicarboxylic acid materials, i.e., acids, anhydrides, or esters. They include a long chain hydrocarbon, generally a polyolefin, which may be substituted with at least 1.05 molecules of an alpha or beta unsaturated $C_4$ to $C_{10}$ dicarboxylic acid, itaconic acid, maleic acid, maleic anhydride, chloromaleic acid, dimethyl fumarate, chloromaleic anhydride, etc. per mole of polyolefin.

Preferred olefin polymers for the reaction with the unsaturated dicarboxylic acids are those polymers made up of a major molar amount of $C_2$ to $C_{10}$, e.g., $C_2$ to $C_5$, monoolefin. Such olefins include ethylene, propylene, butylene, isobutylene, pentene, octene-1, styrene, etc. The polymers may be homopolymers such as polyisobutylene or copolymers of two or more of such olefins. These include copolymers of: ethylene and propylene; butylene and isobutylene; propylene and isobutylene; etc. Other copolymers include those in which a minor molar amount of the copolymer monomers, e.g., 1 to 10 mole percent is a $C_4$ to $C_{18}$ diolefin, e.g., copolymer of isobutylene and butadiene; or a copolymer or ethylene, propylene and 1,4-hexadiene; etc.

In some cases, the olefin polymer may be completely saturated, for example an ethylene-propylene copolymer made by a Ziegler-Natta synthesis using hydrogen as a moderator to control molecular weight.

The olefin polymers will usually have number average molecular weights above about 700, and preferably from about 800 to about 5000. Particularly useful olefin polymers have number average molecular weights within the range of about 1200 and about 5000 with approximately one double bond per polymer chain. An especially suitable starting material for a dispersant additive in polyisobutylene. The number molecular weight for such polymers can be determined by several known techniques. A convenient method for such determination is by gel permeation chromatography (GPC) which additionally provides molecular weight distribution information, see W. W. Yau, J. J. Kirkland and D. D. Bly, "Modern Size Exclusion Liquid Chromatography," John Wiley and Sons, New York, 1979.

Processes for reacting the olefin polymer with the $C_4$–$C_{10}$ unsaturated dicarboxylic acid, anhydride or ester are known in the art. For example, the olefin polymer and the dicarboxylic acid material may be simply heated together as disclosed in U.S. Pat. Nos. 3,361,673 and 3,401,118 to cause a thermal "ene" reaction to take place. Or, the olefin polymer can be first halogenated, for example, chlorinated or brominated to about 1 to 8, preferably 3 to 7 weight percent chlorine, or bromine, based on the weight of polymer, by passing the chlorine or bromine through the polyolefin at a temperature of 60° to 250°, e.g., 120° to 160° C. for about 0.5 to 10, preferably 1 to 7 hours. The halogenated polymer may then be reacted with sufficient unsaturated acid or anhydride at 100° to 250°, usually about 180° to 220° C. for about 0.5 to 10, e.g., 3 to 8 hours. Processes of this general type are taught in U.S. Pat. Nos. 3,087,436; 3,172,892; 3,272,746 and others.

Alternatively, the olefin polymer, and the unsaturated acid material are mixed and heated while adding chlorine to the hot material. Processes of this type are disclosed in U.S. Pat. Nos. 3,215,707; 3,231,587; 3,912,764; 4,110,349; 4,234,435; and in U.K. 1,400,219.

By the use of halogen, about 65 to 96 weight percent of the polyolefin will normally react with the dicarboxylic acid material. Thermal reactions, those carried out without the use of halogen or a catalyst, cause only about 50 to 75 weight percent of the polyisobutylene to react. Chlorination obviously helps to increase the reactivity. For convenience, all of the aforesaid functionality ratios of dicarboxylic acid producing units to polyolefin, e.g., 1.0 to 2.0, etc., are based upon the total amount of polyolefin, that is, the total of both the reacted and unreacted polyolefin, present in the resulting product formed in the aforesaid reactions.

The dicarboxylic acid producing materials can also be further reacted with amines, alcohols, including polyols, amino-alcohols, etc. to form other useful dispersant additives. Thus, if the acid producing material is to be further reacted, e.g., neutralized, then generally a major proportion of at least 50 percent of the acid units up to all the acid units will be reacted.

Useful amine compound for neutralization of the hydrocarbyl substituted dicarboxylic acid material include mono-and polyamines of about 2 to 60, e.g., 3 to 20, total carbon atoms and about 1 to 12, e.g., 2 to 8 nitrogen atoms in the molecule. These amines may be hydrocarbyl amines or may be hydrocarbyl amines including other groups, e.g., hydroxy groups, alkoxy groups, amide groups, nitriles, imidazoline groups, and the like. Hydroxy amines with 1 to 6 hydroxy groups, preferably 1 to 3 hydroxy groups are particularly useful. Preferred amines are aliphatic saturated amines, including those of the general formulas:

(XIII)

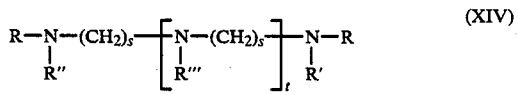

(XIV)

wherein R, R', R" and R'" are independently selected from the group consisting of hydrogen; $C_1$ to $C_{25}$ straight or branched chain alkyl radicals; $C_1$ to $C_{12}$ alkoxy $C_2$ to $C_6$ alkylene radicals; $C_2$ to $C_{12}$ alkyl-amino $C_2$ to $C_6$ alkylene radicals; and wherein R'" can additionally comprise a moiety of the formula:

(XV)

wherein R' is as defined above, and wherein each s and s' can be the same or a different number of from 2 to 6, preferably 2 to 4; and t and t' can be the same or different and each numbers of from 0 to 10, preferably 2 to 7 with the proviso that the sum of t and t' is not greater than 10. To assure a facile reaction, it is preferred that R, R', R", R'", s, s', t and t' be selected in a manner sufficient to provide the compounds of Formulas XIII and XIV with typically at least one primary or secondary amine group, preferably at least two primary or secondary amine groups. This can be achieved by selecting at least one of said R, R', R" or R'" groups of to be hydrogen or by letting t in Formula Ib be at least one when R'" is H or when the (XV) moiety possesses a secondary amino group. The most preferred amine of the above formulas are represented by Formula XIV and contain at least two primary amine groups and at least one, and preferably at least three, secondary amine groups.

Non-limiting examples of suitable amine compounds include: 1,2-diaminoethane; 1,3-diaminopropane; 1,4-diaminobutane; 1,6-diaminohexane; polyethylene amines such as diethylene triamine; triethylene tetramine; tetraethylene pentamine; polypropylene amines such as 1,2-propylene diamine; di-(1,2-propylene)triamine; di(1,3-propylene)triamine; N,N-dimethyl-1,-3-diaminopropane; N,N-di-(2-aminoethyl) ethylene diamine; N,N-di(2-hydroxyethyl)-1,3-propylene diamine; 3-dodecyloxypropylamine; N-dodecyl-1,3-propane diamine; tris hydroxymethylaminomethane (THAM); diisopropanol amine; diethanol amine; triethanol amine; mono-, di-, and tri-tallow amines; amino morpholines such as N-(3-aminopropyl) morpholine; and mixtures thereof.

Other useful amine compounds include: alicyclic diamines such as 1,4-di(aminomethyl) cyclohexane, and heterocyclic nitrogen compounds such as imidazolines, and N-aminoalkyl piperazines of the general formula (XVI):

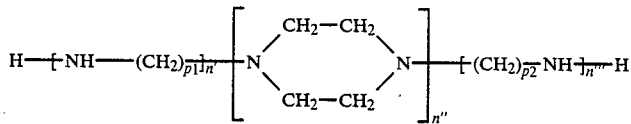

wherein $P_1$ and $P_2$ are the same or different and are each integers of from 1 to 4, and $n'$, $n''$ and $n'''$ are the same or different and are each integers of from 1 to 3.

Non-limiting examples of such amines include 2-pentadecyl imidazoline; N-(2-aminoethyl) piperazine; etc.

Commercial mixtures of amine compounds may advantageously be used. For example, one process for preparing alkylene amines involves the reaction of an alkylene dihalide (such as ethylene dichloride or propylene dichloride) with ammonia, which results in a complex mixture of alkylene amines wherein pairs of nitrogens are joined by alkylene groups, forming such compounds as diethylene triamine, triethylenetetramine, tetraethylene pentamine and isomeric piperazines. Low cost poly (ethyleneamine) compounds averaging about 5 to 7 nitrogen atoms per molecular are available commercially under trade names such as "Polyamine H," "Polyamine 400," "Dow Polyamine E-100," etc.

Useful amines also include polyoxyalkylene polyamines such as those of the formulae (XVII):

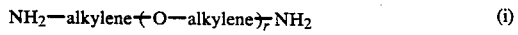

where "r" has a value of about 3 to 70 and preferably 10 to 35; and the formula (XVIII):

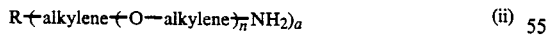

wherein "n" has a value of about 1 to 40 with the provision that the sum of all the n's is from about 3 to about 70 and preferably from about 6 to about 35 and R is a polyvalent saturated hydrocarbon radical of up to ten carbon atoms wherein the number of substituents on the R group is represented by the value of "a", which is a number from 3 to 6. The alkylene groups in either formula (XVII) or (XVIII) may be straight or branched chains containing about 2 to 7, and preferably about 2 to 4 carbon atoms.

The polyoxyalkylene polyamines above, preferably polyoxyalkylene diamines and polyoxyalkylene triamines, may have average molecular weights ranging from about 200 to about 4000 and preferably from about 400 to about 2000. The preferred polyoxyalkylene polyamines include the polyoxyethylene and polyoxypropylene diamines cular weights ranging from about 200 to 2000. The polyoxyalkylene polyamines are commercially available and may be obtained, for example, from the Jefferson Chemical Company, Inc. under the trade name "Jeffamines D-230, D-400, D-1000, D-2000, T-403," etc.

The amine is readily reacted with the dicarboxylic acid material, e.g., alkenyl succinic anhydride, by heating an oil solution containing 5 to 95 weight percent of dicarboxylic acid material to about 100° to 250° C., preferably 125° to 175° C., generally for 1 to 10, e.g., 2 to 6 hours, until the desired amount of water is removed. The heating is preferably carried out to favor formation of imides or mixtures of imides and amides, rather than amides and salts. Reaction ratios of dicarboxylic acid material to equivalents of amine as well as the other nucleophilic reactants described herein can vary considerably, depending upon the reactants and type of bonds formed. Generally from 0.1 to 1.0, preferably about 0.2 to 0.6, e.g., 0.4 to 0.6, moles of dicarboxylic acid moiety content (e.g. grafted maleic anhydride content) is used, per equivalent of nucleophilic reactant, e.g. amine. For example, about 0.8 mole of a pentamine (having two primary amino groups and 5 equivalents of nitrogen per molecule) is preferably used to convert into a mixture of amides and imides, the product formed by reacting one mole of olefin with sufficient maleic anhydride to add 1.6 moles of succinic anhydride groups per mole of olefin, i.e. preferably the pentamine is used in an amount sufficient to provide about 0.4 mole (that is 1.6+[0.8×5] mole) of succinic anhydride moiety per nitrogen equivalent of the amine.

The nitrogen-containing auxiliary dispersant can be further treated by boration as generally taught in U.S. Pat. Nos. 3,087,936 and 3,254,025 (the entirety of which is incorporated by reference). This is readily accomplished by treating said acyl nitrogen dispersant with a boron compound selected from the class consisting of boron oxide, boron halides, boron acids and esters of boron acids in an amount to provide from about 0.1 atomic proportion of boron for each mole of said acylated nitrogen composition to about 20 atomic proportions of boron for each atomic proportion of nitrogen of said acylated nitrogen composition. Usefully the dispersants of the inventive combination contain from about 0.05 to 2.0 weight percent, e.g., 0.05 to 0.7 weight percent, boron based on the total weight of said borated acyl nitrogen compound. The boron, which appears to be in the product as dehydrated boric acid polymer (primarily $(HBO_2)_3$), is believed to attach the dispersant imides and diimides as amine salts, e.g., the metaborate salt of said diimide.

Treating is readily carried out by adding from about 0.05 to 4, e.g., 1 to 3 weight percent (based on the weight of said acyl nitrogen compound) of said boron compound, preferably boric acid which is most usually added as a slurry to said acyl nitrogen compound and heating with stirring at from about 135° C. to 190°, e.g., 140°-170° C., for from 1 to 5 hours followed by nitrogen stripping at said temperature ranges. Or, the boron treatment can be carried out by adding boric acid to the hot reaction mixture of the dicarboxylic acid material and amine while removing water.

Tris (hydroxymethyl) amino methane (THAM) can be reacted with the aforesaid acid material to form amides, imides or ester type additives as taught by U.K. No. 984,409, or to form oxazoline compounds and borated oxazoline compounds as described, for example, in U.S. Pat. Nos. 4,102,798; 4,116,876 and 4,113,639.

The ashless dispersants may also be esters derived from the long chain hydrocarbyl substituted dicarboxylic acid material and from hydroxy compounds such as monohydric an polyhydric alcohols or aromatic compounds such as phenols and napthols, etc. The polyhydric alcohols are the most preferred hydroxy compound and preferably contain from 2 to about 10 hydroxy radicals, for example, ethylene glycol, diethylene glycol, triethylene glycol, tetraethylene glycol, dipropylene glycol, and other alkylene glycols in which the alkylene radical contains from 2 to about 8 carbon atoms. Other useful polyhydric alcohols include glycerol, mono-oleate of glycerol, monostearate of glycerol, monomethyl ether of glycerol, pentaerythritol, dipentaerythritol, etc.

The ester dispersant may also be derived from unsaturated alcohols such as allyl alcohol, cinnamyl alcohol, propargyl alcohol, 1-cyclohexane-3-ol, and oleyl alcohol. Still other classes of the alcohols capable of yielding the esters of this invention comprise the etheralcohols and aminoalcohols including, for example, the oxy-alkylene, oxy-arylene-, amino-alkylene-, and amino-arylene-substituted alcohols having one or more oxy-alkylene, amino-alkylene or amino-arylene radicals. They are exemplified by Cellosolve, Carbitol, N,N,N',N'-tetrahydroxy-trimethylene di-amine, and ether-alcohols having up to about 150 oxy-alkylene radicals in which the alkylene radical contains from 1 to about 8 carbon atoms.

The ester dispersant may be di-esters of succinic acids or acidic esters, i.e., partially esterified succinic acids; as well as partially esterified polyhydric alcohols or phenols, i.e., esters having free alcohols or phenolic hydroxyl radicals. Mixtures of the above illustrated esters likewise are contemplated within the scope of this invention.

The ester dispersant may be prepared by one of several known methods as illustrated for example in U.S. Pat. No. 3,381,022.

Hydroxyamines which can be reacted with the long chain hydrocarbon substituted dicarboxylic acid material mentioned above to form dispersants include 2-amino-1-butanol, 2-amino-2-methyl-1-propanol, p-(beta-hydroxy-ethyl)-aniline, 2-amino-1-propanol, 3-amino-1-propanol, 2-amino-2-methyl-1,3-propane-diol, 2-amino-2-ethyl-1,3-propanediol, N-(beta-hydroxy-propyl)-N'-(beta-amino-ethyl)-piperazine, tris(hydroxymethyl) amino-methane (also known as trismethylolaminomethane), 2-amino-1-butanol, ethanolamine, beta-(beta-hydroxyethoxy)-ethylamine, and the like. Mixtures of these or similar amines can also be employed.

A very suitable dispersant is one derived from polyisobutylene substituted with succinic anhydride groups and reacted with polyethylene amines, e.g., tetraethylene pentamine, pentaethylene hexamine, polyoxyethylene and polyoxypropylene amines, e.g., polyoxypropylene diamine, trismethylolaminomethane and pentaerythritol, and combinations thereof. One preferred dispersant combination involves a combination of (A) polyisobutene substituted with succinic anhydride groups and reacted with (B) a hydroxy compound, e.g., pentaerythritol, (C) a polyoxyalkylene polyamine, e.g., polyoxypropylene diamine, and (D) a polyalkylene polyamine, e.g., polyethylene diamine and tetraethylene pentamine using about 0.3 to about 2 moles each of (B) and (D) and about 0.3 to about 2 moles of (C) per mole of (A) as described in U.S. Pat. No. 3,804,763. Another preferred dispersant combination involves the combination of (A) polyisobutenyl succinic anhydride with (B) a polyalkylene polyamine, e.g., tetraethylene pentamine, and (C) a polyhydric alcohol or polyhydroxy-substituted aliphatic primary amine, e.g., pentaerythritol or trismethylolaminomethane as described in U.S. Pat. No. 3,632,511.

A(ii) Also useful as ashless nitrogen-containing dispersant in this invention are dispersants wherein a nitrogen containing polyamine is attached directly to the long chain aliphatic hydrocarbon as shown in U.S. Pat. Nos. 3,275,554 and 3,565,804 where the halogen groups on the halogenated hydrocarbon is displaced with various alkylene polyamines.

A(iii) Another class of nitrogen containing dispersants which may be used are those containing Mannich base or Mannich condensation products as they are known in the art. Such Mannich condensation products generally are prepared by condensing about 1 mole of a high molecular weight hydrocarbyl substituted mono- or polyhydroxy benzene (e.g., having a number average molecular weight of 1,000 or greater) with about 1 to 2.5 moles of formaldehyde or paraformaldehyde and about 0.5 to 2 moles polyalkylene polyamine as disclosed, e.g., in U.S. Pat. Nos. 3,442,808; 3,649,229 and 3,798,165 (the disclosures which are hereby incorporated by reference in their entirety). Such Mannich condensation products may include a long chain, high molecular weight hydrocarbon on the phenol group or may be reacted with a compound containing such a hydrocarbon, e.g., polyalkenyl succinic anhydride as shown in said aforementioned '808.

DETERGENTS

Metal-containing rust inhibitors and/or detergents are frequently used with ashless dispersants. Such detergents and rust inhibitors include the metal salts of sulfonic acids, alkyl phenols, sulphurized alkyl phenols, alkyl salicylates, naphthenates, and other oil soluble mono-di-carboxylic acids. Highly basic (or "overbased") metal salts, which are frequently used as detergents, appear particularly prone to interaction with the ashless dispersant. Usually these metal-containing rust inhibitors and detergents are used in lubricating oil in amounts of about 0.01 to 10, e.g., 0.1 to 5, weight percent, based on the weight of the total lubricating composition.

Highly basic alkaline earth metal sulfonates are frequently used as detergents. They are usually produced by heating a mixture comprising an oil-soluble sulfonate or alkaryl sulfonic acid, with an excess of alkaline earth metal compound above that required for complete neutralization of any sulfonic acid present and thereafter forming a dispersed carbonate complex by reacting the excess metal with carbon dioxide to provide the desired overbasing. The sulfonic acids are typically obtained by the sulfonation of alkyl substituted aromatic hydrocarbons such as those obtained from the fractionation of petroleum by distillation and/or extraction or by the alkylation of aromatic hydrocarbons as for example those obtained by alkylating benzene, toluene, xylene, naphthalene, diphenyl and the halogen derivatives such as chlorobenzene, chlorotoluene and chloronapthalene. The alkylation may be carried out in the presence of a catalyst with alkylating agents having from about 3 to more than 30 carbon atoms. For example, haloparaffins, olefins obtained by dehydrogenation of paraffins, polyolefin polymers produced from ethylene, propylene, etc. are all suitable. The alkaryl sulfonates usually contain from about 9 to about 70 or more carbon atoms, preferably from about 16 to about 50 carbon atoms per alkyl substituted aromatic moiety.

The alkaline earth metal compounds which may be used in neutralizing these alkaryl sulfonic acids to provide the sulfonates includes the oxides and hydroxides, alkoxides, carbonates, carboxylate, sulfide, hydrosulfide, nitrate, borates and ethers of magnesium, calcium, strontium and barium. Examples are calcium oxide, calcium hydroxide, magnesium oxide, magnesium acetate and magnesium borate. As noted, the alkaline earth metal compound is used in excess of that required to complete neutralization of the alkaryl sulfonic acids. Generally, the amount ranges from about 100 to 220 percent, although it is preferred to use at least 125 percent, of the stoichiometric amount of metal required for complete neutralization.

Various other preparations of basic alkaline earth metal alkaryl sulfonates are known, such as U.S. Pat. Nos. 3,150,088 and 3,150,089 wherein overbasing is accomplished by hydrolysis of an alkoxide-carbonate complex with the alkaryl sulfonate in a hydrocarbon solvent-diluent oil.

A preferred alkaline earth sulfonate additive is magnesium alkyl aromatic sulfonate having a high total base number ("TBN") ranging from about 300 to about 400 with the magnesium sulfonate content ranging from about 25 to about 32 weight percent, based upon the total weight of the additive system dispersed in mineral lubricating oil.

Neutral metal sulfonates are frequently used as rust inhibitors. Polyvalent metal alkyl salicylate and napthenate materials are known additives for lubricating oil compositions to improve their high temperature performance and to counteract deposition of carbonaceous matter on pistons (U.S. Pat. No. 2,744,069). An increase in reserve basicity of the polyvalent metal alkyl salicylates and napthenates can be realized by utilizing alkaline earth metal, e.g., calcium, salts of mixtures of $C_8$-$C_{26}$ alkyl salicylates and phenates (see U.S. Pat. No. 2,744,069) or polyvalent metal salts of alkyl salicyclic acids, said acids obtained from the alkylation of phenols followed by phenation, carboxylation and hydrolysis (U.S. Pat. No. 3,704,315) which could then be converted into highly basic salts by techniques generally known and used for such conversion. The reserve basicity of these metal-containing rust inhibitors is usefully at TBN levels of between 60 and 150. Included with the useful polyvalent metal salicylate and naphthenate materials are the methylene and sulfur bridge materials which are readily derived form alkyl substituted salicylic or naphthenic acids or mixtures of either of both with alkyl substituted phenols. Basic sulfurized salicylates and a method for their preparation is shown in U.S. Pat. No. 3,595,791. Such materials include alkaline earth metal, particularly magnesium, calcium, strontium and barium salts of aromatic acids having the general formula:

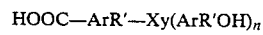

where Ar is an aryl radical of 1 to 6 rings, R' is an alkyl group having from about 8 to 50 carbon atoms, preferably 12 to 30 carbon atoms (optimumally about 12), X is a sulfur (—S—) or methylene (—CH$_2$—) bridge, Y is a number from 0 to 4 and n is a number from 0 to 4.

Preparation of the overbased methylene bridged salicylate-phenate salt is readily carried out by conventional techniques such as by alkylation of a phenol followed by phenation, carboxylation, hydrolysis, methylene bridging a coupling agent such as an alkylene dihalide followed by salt formation concurrent with carbonation. An overbased calcium salt of a methylene bridged phenol-salicylic acid of the general formula:

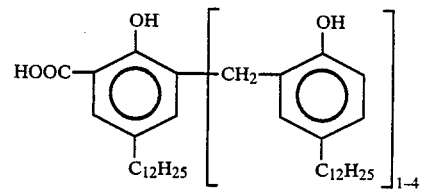

with a TBN of 60 to 150 is highly useful in this invention.

The sulfurized phenates can be considered the "metal salt of a phenol sulfide" which thus refers to a metal salt whether neutral or basic, of a compound typified by the general formula:

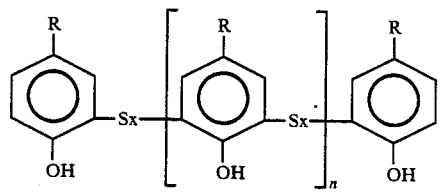

where x=1 or 2; n=0, 1 or 2 or a polymeric form of such a compound, where R is an alkyl radical, n and x are each integers from 1 to 4, and the average number of carbon atoms in all of the R groups is at least about 9 in order to ensure adequate solubility in oil. The individual R groups may each contain from 5 to 40, preferably 8 to 20, carbon atoms. The metal salt is prepared by reacting an alkyl phenol sulfide with a sufficient quantity of metal containing material to impart the desired alkalinity to the sulfurized metal phenate.

Regardless of the manner in which they are prepared, the sulfurized alkyl phenols generally contain from about 2 to about 14 percent by weight, preferably about 4 to about 12 weight percent sulfur based on the weight of sulfurized alkyl phenol.

The sulfurized alkyl phenol may be converted by reaction with a metal containing material including oxides, hydroxides and complexes in an amount sufficient to neutralize said phenol and, if desired, to overbase the product to a desired alkalinity by procedures well known in the art. Preferred is a process of neutralization utilizing a solution of metal in a glycol ether.

The neutral or normal sulfurized metal phenates are those in which the ratio of metal to phenol nucleus is about 1:2. The "overbased" or "basic" sulfurized metal phenates are sulfurized metal phenates wherein the ratio of metal to phenol is greater than that of stoichiometric, e.g., basic sulfurized metal dodecyl phenate has a metal content up to (or greater) than 100 percent in excess of the metal present in the corresponding normal sulfurized metal phenates. The excess metal is produced in oil-soluble or dispersible form (as by reaction with $CO_2$).

ANTIWEAR ADDITIVES

Dihydrocarbyl dithiophosphate metal salts are frequently added to lubricating oil compositions as antiwear agents. They may provide antioxidant activity. The zinc slats are most commonly used in lubricating oil in amounts of 0.1 to 10, preferably 0.2 to 2 weight percent, based upon the total weight of the lubricating oil composition. They may be prepared in accordance with known techniques by first forming a dithiophosphoric acid, usually by reaction of an alcohol or a phenol with $P_2S_5$ and then neutralizing the dithiophosphoric acid with a suitable zinc compound.

Mixtures of alcohols may be used including mixtures of primary and secondary alcohols, secondary generally for importing improved antiwear properties, with primary giving improved thermal stability properties. Mixtures of the two are particularly useful. In general, any basic or neutral zinc compound could be used but the oxides, hydroxides and carbonates are most generally employed. Commercial additives frequently contain an excess of zinc due to use of an excess of the basic zinc compound in the neutralization reaction.

The zinc dihydrocarbyl dithiophosphates useful in the present invention are oil soluble salts of dihydrocarbyl esters of dithiophosphoric acids and may be represented by the following formula:

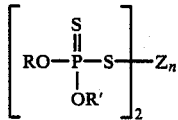

wherein R and R' may be the same or different and are hydrocarbyl radicals containing from 1 to 18, perferably 2 to 12 carbon atoms and including radicals such as alkyl, alkenyl, aryl, aralkyl, alkaryl and cycloaliphatic radicals. Particularly preferred as R and R' groups are alkyl groups of 2 to 8 carbon atoms. Thus, the radicals may, for example, be ethyl, n-propyl, i-propyl, n-butyl, sec-butyl, amyl, n-hexyl, i-hexyl, n-octyl, decyl, dodecyl, octadecyl, 2-ethylhexyl, phenyl, butyl-phenyl, cyclohexyl, methlcylcopentyl, propenyl, butenyl, etc. In order to obtain oil solubility, the total number of carbon atoms (i.e., R and R') in the dithiophosphoric acid generally should be about 5 or greater.

ANTIOXIDANTS

Materials which have been observed to be effective antioxidants in lubricating oil compositions are oil-soluble copper compounds, desirably in the form of synthetic or natural carboxylic acid Cu salts. Examples include $C_{10}$ to $C_{18}$ fatty acids such as stearic or palmitic acid. But unsaturated acids (such as oleic acid), branched carboxylic acids (such as naphthenic acids) of molecular weight from 200 to 500 and, synthetic carboxylic acids are all used because of the acceptable handling and solubility properties of the resulting copper carboxylates.

Suitable oil soluble dithiocarbamates have the general formula $(R_{11} R_{12} N C S S)_n$ Cu; where n is 1 or 2 and $R_{11}$ and $R_{12}$ may be the same or different and are hydrocarbyl radicals containing from 1 to 18 carbon atoms and including radicals such as alkyl, alkenyl, aryl, aralkyl, alkaryl and cycloaliphatic radicals. Particularly preferred as $R_{11}$ and $R_{12}$ groups are alkyl groups of 2 to 8 carbon atoms. Thus, the radicals may, for example, be ethyl, n-propyl, i-propyl, n-butyl, i-butyl, sec-butyl, amyl, n-hexyl, i-hexyl, n-octyl, decyl, dodecyl, octadecyl, 2-ethylhexyl, phenyl butyl-phenyl, cyclohexyl, methylcyclopentyl, propenyl, butenyl, etc. In order to obtain oil solubility, the total number of carbon atoms (i.e., $R_{11}$ and $R_{12}$) generally should be about 5 or greater.

Copper sulphonates, phenates, and acetyl acetonates may also be used.

These antioxidants are used in amounts such that, in the final lubricating or fuel composition, a copper concentration of from 1 to about 500 ppm is present.

Lubricant Oil Basestock

The ashless dispersant, metal detergent, antiwear agent and compatibilizing material of the present invention will be generally used in admixture with a lube oil basestock, comprising an oil of lubricating viscosity, including natural and synthetic lubricating oils and mixtures thereof. The lubricating oil base stock conveniently has a viscosity of typically about 2.5 to about 12, and preferably about 2.5 to about 9 cs. at 100° C.

Natural oils include animal oils and vegetable oils (e.g., castor, lard oil) liquid petroleum oils and hydrorefined, solvent-treated or acid-treated mineral lubricating oils of the paraffinic, naphthenic and mixed paraffinic-naphthenic types. Oils of lubricating viscosity derived from coal or shale are also useful base oils.

Synthetic lubricating oils include hydrocarbon oils and halo-substituted hydrocarbon oils such as polymerized and interpolymerized olefins (e.g., polybutylenes, polypropylenes, propylene-isobutylene copolymers, chlorinated polybutylenes, poly(1-hexenes), poly(1-octenes), poly(1-decenes)); alkylbenzenes (e.g., dodecylbenzenes, tetradecylbenzenes, dinonylbenzenes, di(2-ethylhxyl)benzenes); polyphenyls (e.g., biphenyls, terphenyls, alkylated polyphenols); and alkylated diphenyl ethers and alkylated diphenyl sulfides and the derivatives, analogs and homologs thereof.

Alkylene oxide polymers and interpolymers and derivatives thereof where the terminal hydroxyl groups have been modified by esterification, etherification, etc., constitute another class of known synthetic lubricating oils. These are exemplified by polyoxyalkylene polymers prepared by polymerization of ethylene oxide or propylene oxide, the alkyl and aryl ethers of these polyoxyalkylene polymers (e.g., methyl-polyisopropylene glycol ether having an average molecular weight of 1000, diphenyl ether of poly-ethylene glycol having a molecular weight of 500-1000, diethyl ether of polypropylene glycol having a molecular weight of 1000-1500); and mono- and polycarboxylic esters thereof, for example, the acetic acid esters, mixed $C_3$–$C_8$ fatty acid esters and $C_{13}$ Oxo acid diester of tetraethylene glycol.

Another suitable class of synthetic lubricating oils comprises the esters of dicarboxylic acids (e.g., phthalic acid, succinic acid, alkyl succinic acids and alkenyl succinic acids, maleic acid, azelaic acid, suberic acid, sebasic acid, fumaric acid, adipic acid, linoleic acid dimer, malonic acid, alkylmalonic acids, alkenyl malonic acids) with a variety of alcohols (e.g., butyl alcohol, hexyl alcohol, dodecyl alcohol, 2-ethylhexyl alcohol, ethylene glycol, diethylene glycol monoether, propylene glycol). Specific examples of these esters include dibutyl adipate, di(2-ethylhexyl)sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, and the complex ester formed by reacting one mole of sebacic acid with two moles of tetraethylene glycol and two moles of 2-ethylhexanoic acid.

Esters useful as synthetic oils also include those made from $C_5$ to $C_{12}$ monocarboxylic acids and polyols and polyol ethers such as neopentyl glycol, trimethylolpropane, pentaerythritol, dipentaerythritol and tripentaerythritol.

Silicon-based oils such as the polyalkyl-, polyaryl-, polyalkoxy-, or polyaryloxysiloxne oils and silicate oils comprise another useful class of synthetic lubricants; they include tetraethyl silicate, tetraisopropyl silicate, tetra-(2-ethylhexyl)silicate, tetra-(4-methyl-2-ethylhexyl)silicate, tetra-(p-tert-butylphenyl)silicate, hexa-(4-methyl-2-pentoxy)disiloxane, poly(methyl)siloxanes and poly(methylphenyl)siloxanes. Other synthetic lubricating oils include liquid esters of phosphorus-containing acids (e.g., tricresyl phosphate, trioctyl phosphate, diethyl ester of decylphosphonic acid) and polymeric tetrahydrofurans.

Unrefined, refined and rerefined oils can be used in the lubricants of the present invention. Unrefined oils are those obtained directly from a natural or synthetic source without further purification treatment. For example, a shale oil obtained directly from retorting operations, a petroleum oil obtained directly from distillation or ester oil obtained directly from an esterification process and used without further treatment would be an unrefined oil. Refined oils are similar to the unrefined oils except they have been further treated in one or more purification steps to improve one or more properties. Many such purification techniques, such as distillation, solvent extraction, acid or base extraction, filtration and percolation are known to those skilled in the art. Rerefined oils are obtained by processes similar to those used to obtain refined oils applied to refined oils which have been already used in service. Such rerefined oils are also known as reclaimed or reprocessed oils and often are additionally processed by techniques for removal of spent additives and oil breakdown products.

This invention is further illustrated by the examples which follow. The examples are not intended to limit the scope of the invention in any way.

EXAMPLES

Preparation of Dispersants Using 1300 ovs/M/$_n$ PIB

Example 1(a)

200 g of a polyisobutenyl succinic anhydride (PIBSA) having a saponification number (SAP) of 90.4 and active ingredient level (A.I.) of 90.5 wt. % and a number average molecular weight of 1300 were mixed in a reaction flask with 176 g of S150N lubricating oil (solvent neutral having a viscosity of about 150 SSU at 100° C.) and heated to about 149° C. Then, 16.7 g of a commercial grade of polyethyleneamine known as polyamine bottoms (PAM) was added and the mixture heated to 150° C. for about 2 hours, this was followed by a half hour of nitrogen stripping. The oil solution was filtered. It analyzed for 1.46 wt. % nitrogen and had a kinematic viscosity (kv) of 225 cSt at 100° C.

Example 1(b)

The Example 1(b) material was prepared in the same manner as Example 1(a) except that after nitrogen stripping, the reaction mixture was cooled to 100° C. and 33.8 g of ethyl acetoacetate was added. The reaction mixture was maintained at 100° C. for one hour and heated to 150° C. for another 2 hours, followed by a half hour of nitrogen stripping at 150° C. It was filtered and collected. It analyzed for 1.37 wt. % N and had a kv of 331 cSt at 100° C.

Example 1(c)

About 16.7 g (0.087 mole) of PAM was mixed with 33.8 g (0.26 mole) of ethylacetoacetate and heated to 100° C. for one hour. Thereafter the reaction mixture was heated to 150° C. for two hours and nitrogen stripped to remove the ethanol by-product. The adduct was cooled to about 100° C. and an oil solution containing 200 g of the PIBSA used in Example 1(a) and 203 g of mineral oil S150N was added. The reaction mixture was then heated to 150° C. and soaked at this temperature for 2 hours followed by nitrogen stripping for one hour. The filtered oil solution analyzed for 1.36 wt. % nitrogen and had a kv of 419 cSt at 100° C.

Preparation of Dispersants Using 1700 $\overline{M}_n$ PIB

Example 2(b)

200 g (0.1238 mole) of a PIBSA having a SAP number of 69.3 an A.I. of 85.2 and a number average molecular weight of 1700 were mixed in a reaction flask with 151 g of S150N oil while stirring under a nitrogen blanket. Then 12.6 g (0.0651 mole) of PAM was added and the reaction mixture was slowly heated to 150° C. for 2 hours, and then nitrogen stripped for a half hour at 150° C. The oil solution was filtered and analyzed for 1.17 wt. % nitrogen and had a kv of 416 cSt at 100° C.

Example 2(b)

Example 2(b) was prepared in the same manner as example 2(a) except that after the nitrogen stripping was concluded, 25.4 g (0.195 mole) of ethyl acetoacetate was added at 100° C. The reaction mixture was kept at 100° C. for one hour, heated to 150° C. for two hours, and nitrogen stripped a one half hour. The filtered oil solution analyzed for 1.11 wt. % nitrogen and had a kv of 563 cSt at 100° C.

Example 2(c)

About 288 g (0.651 mole) of a polyamine-ethyl acetoacetate adduct prepared as described in Example 1(c) was mixed with 200 g (0.1238 mole) of the PIBSA used in Example 2(a) and 168 g of S15ON oil. The mixture was then slowly heated to 150° C. (under nitrogen) for 2 hours. The oil solution was then nitrogen stripped for a half hour and filtered. The product analyzed for 1.18 wt. % nitrogen and had a kv of 742 cSt at 100° C.

Preparation of Dispersants Using 1900 ovs/M/$_n$ PIB

Example 3(a)

200 g (0.1063 mole) of a PIBSA having a SAP number of 59.2 and an A.I. of 78.9 wt. % with a number average molecular weight of 1900 were mixed in a reaction flask with 138 g of S150N oil and 10.8 g (0.0559 mole) of PAM. The reaction mixture was then slowly heated to 150° C. and soaked for two hours. The oil solution was sparged with nitrogen for one half hour and filtered. It analyzed for 1.05 wt. % nitrogen and had a kv of 504 cSt at 100° C.

Example 3(b)

The material of Example 3(b) was prepared in the same manner as Example 3(a) except that after the nitrogen stripping, the reaction mixture was cooled to 100° C. and 21.8 g (0.1677 mole) of ethyl acetoacetate was added. The oil solution was heated to 150° C. for two hours and stripped with nitrogen for a half hour. The filtered product analyzed for 0.99 wt. % nitrogen and had a kv of 800 cSt at 100° C.

Example 3(c)

About 24.7 g (0.0559 mole) of a polyamine ethyl acetoacetate reaction product prepared as described in Example 1(c) was mixed with 200 g (0.1063 mole) of the PIBSA used in Example 3(a)-3(c) and 151.4 g of S150N oil. The reaction mixture was then slowly heated to 150° C. and held at this temperature for two hours. The oil solution was then nitrogen stripped for a half hour at 150° C. and filtered. The filtered product analyzed for 0.99 wt. % nitrogen and had a kv of 974 cSt at 100° C.

Preparation of Dispersants Using 2250 ovs/M/$_n$ PIB

Example 4(a)

About 200 g (0.09 mole) of a PIBSA having a SAP number of 52.2 and an A.I. of 78.9 wt. % with a number average molecular weight of 2250 were combined with 9.5 g (0.05 mole) of PAM, and 123.5 g of S150N oil and slowly heated to 150° C. The reaction mixture was heat soaked at 150° C. for two hours and nitrogen stripped for a half hour. The filtered oil solution analyzed for 0.95 wt. % nitrogen and had a kv of 671 cSt at 100° C.

Example 4(b)

The material of Example 4(b) was prepared in the same manner as Example 4(a) except that after the nitrogen stripping, the reaction product was cooled to 100° C. and 19.5 (0.15 mole) of ethyl acetoacetate was added. The mixture was kept at 100° C. for one hour and heated to 150° C. for two hours. It was stripped with nitrogen for a half hour at 150° C. to remove the ethanol by-product and filtered. It analyzed for 0.91 wt. % nitrogen and had a kv of 926 cSt at 150° C.

Example 4(c)

About 22.2 g (0.05 mole) of the PAM ethyl acetoacetate reaction product prepared as described in Example 1(c) was mixed with 200 g (0.09 mole) of the PIBSA used in Example 4(a) and 136 g of S150N oil. The reaction mixture was then slowly heated to 150° C. for two hours and nitrogen stripped for one half hour. The filtered product analyzed for 0.95 wt. % nitrogen and had a kv of 1057 cSt at 100° C.

The materials of Examples 1(a) to 4(c) were mixed with various amounts of mineral oil. The resulting formulations were tested in using various standard procedures including the sludge inhibition test (SIB) and the varnish inhibition test (VIB).

The SIB and VIB tests forecast the performance of a lubricant in a gasoline engine.

The SIB test employs a used crankcase mineral lubricating oil composition (having an original viscosity of about 325 SUS at 37.8° C.) which has been used in a taxicab driven generally only for short trips. This causes a buildup of sludge precursors. The oil used contains only a refined base mineral oil, a viscosity index improver, a pour point depressant and zinc dialkyldithiophosphate antiwear additives. The oil contains no sludge dispersants. Such oil is acquired by draining and refilling taxicab crankcases at about 1000-2000 mile intervals.

The SIB test is conducted in the following manner: the used crankcase oil is freed of sludge by centrifuging for one half hour at about 39,000 gravities (gs). The resulting clear bright red oil is then decanted from the separated insoluble particles. However, the supernatant oil still contains oil-soluble sludge precursors which (under the conditions employed by the SIB test) tend to form additional oil-insoluble deposits of sludge. The sludge inhibiting properties of the additive being tested is determined by adding to the used oil, 0.5 wt. % on an active basis, of the particular additive being tested. Ten grams of the sample tested is then placed in a stainless steel centrifuge tube and heated at 140° C. for 16 hours in the presence of air. Following the heating, the tube containing oil is cooled and centrifuged for 30 minutes at about 39,000 gs. Any deposits of new sludge that form in this step are separated from the decanting supernatant oil and then carefully washed with 15 ml. of pentane to remove all remaining oils. The weight of the new solid sludge that forms in the test in milligrams) is determined (after drying the residue) by weighing it. The results are reported as milligrams of sludge per ten grams of oil. Differences as small as one part per ten thousand can be measured. The less new sludge formed, obviously the more effective is the additive as a dispersant. In other words, if the additive is effective, it will maintain in suspension, during centrifugation, a portion of the new sludge that forms on heating and oxidation.

In the VIB test, a test sample consisting of ten grams of lubricating oil containing 0.5 wt. %, (on an active basis) of the additive being evaluated is used. The test oil is a lubricating oil obtained from a taxi which has been operated for about 2000 miles with the lubricating oil. The sample is heat soaked overnight at about 140° C. and thereafter centrifuged to remove the sludge. The supernatant fluid is subjected to heat cycling from about 150° C. to room temperature over a period of 3.5 hours at a frequency of about two cycles per minute. During the heating phase, a gas containing a mixture of 0.7 volume percent $SO_2$, 1.4 volume percent NO and the balance air is bubbled through the test sample; during the cooling phase, water vapor is bubbled through the sample. At the end of the test period, (which testing cycle can be repeated as necessary to determine the inhibiting effect of any additive), the wall surfaces of the test flasks in which the samples are visually evaluated for varnish inhibition. The amount of varnish deposited on the walls is rated at values of from one to eleven with the higher number being the greater amount of varnish. This test also forecasts the varnish results obtained as a consequence of carrying out the ASTM MS-VD engine tests.

Table II portrays all of the results from these Examples 1(a) to 4(c).

In each case, it is clear that the inventive material causes no loss of viscosity at the higher temperatures.

TABLE II

| Example | PIB $M_n$ | PIBSA SAP NO.[1] | PIBSA (wt. % AI) | PIBSA, g. (moles) | PAM, g. (moles) | EAA, g. (moles) | OIL, g. | wt. % N | Vis[2] | SIB | VIB |
|---|---|---|---|---|---|---|---|---|---|---|---|
| 1(a) [Comparative] | 1300 | 90.4 | 90.5 | 200 g (.16) | 16.7 g (.087) | — | 176 | 1.46 | 225 | 3.95 | 4 |
| 1(b) | 1300 | 90.4 | 90.5 | 200 g (.16) | 16.7 g (.087) | 33.8 g (.26) | 203 | 1.37 | 331 | 1.35 | 3 |
| 1(c) | 1300 | 90.4 | 90.5 | 200 g (.16) | (3) | (3) | 203 | 1.36 | 419 | 2.19 | 3 |
| 2(a) [Comparative] | 1700 | 69.3 | 85.2 | 200 g (.123) | 12.6 g (.065) | — | 151 | 1.17 | 416 | 3.95 | 5 |
| 2(b) | 1700 | 69.3 | 85.2 | 200 g (.123) | 12.6 g (.065) | 25.4 g (.195) | 168 | 1.11 | 563 | 2.03 | 3½ |
| 2(c) | 1700 | 69.3 | 85.2 | 200 g (.123) | (4) | (4) | 168 | 1.18 | 742 | 2.27 | 4 |
| 3(a) [Comparative] | 1900 | 59.6 | 82.2 | 200 g (.106) | 10.8 g (.05) | — | 138 | 1.05 | 504 | 3.43 | 5 |
| 3(b) | 1900 | 59.5 | 82.2 | 200 g (.106) | 10.8 g (.056) | 21.8 g (.164) | 151 | .99 | 800 | 2.15 | 4 |
| 3(c) | 1900 | 59.5 | 82.2 | 200 g (.106) | (5) | (5) | 151 | .99 | 974 | 1.63 | 4 |
| 4(a) [Comparative] | 2250 | 52.2 | 78.9 | 200 g (.09) | 9.5 g (.05) | — | 123.5 | .95 | 671 | 2.34 | 3¼ |
| 4(b) | 2250 | 52.2 | 78.9 | 200 g (.09) | 9.5 g (.05) | 19.5 g (.15) | 136 | .91 | 926 | 1.74 | 3¼ |
| 4(c) | 2250 | 52.2 | 78.9 | 200 g (.09) | (6) | (6) | 136 | .95 | 1057 | 1.69 | 3½ |

Notes to Table II:
[1]Saponification No. = mgs. KOH required to saponify 1 gram of sample
[2]Viscosity units = cSt at 100° C.
[3]Pre-reacted PAM-EAA, 38.7 g (0.087 mole)
[4]Pre-reacted PAM-EAA, 28.8 g (0.065 mole)
[5]Pre-reacted PAM-EAA, 24.7 g (0.056 mole)
[6]Pre-reacted PAM-EAA, 22.15 g (0.050 mole)

For each set of materials using a single molecular weight PIB starting material, it is clear that the SIB results for the inventive compositions are substantially superior to those for the comparative example. A similar trend is apparent for the VIB tests although for the 2250 $\overline{M}_n$ materials of Examples 4(b) and 4(c), the VIB tests give essentially the same results as the material of comparative Example 4(a).

Even on preliminary tests such as these, the inventive compositions show clear superiority over their closest relations, the materials contained the nonadducted PIB-SA-PAM.

The same set of dispersants were then mixed into lubricating oil formulations and the viscosity measured at 100° C. and −20° C.

They were mixed with Solvent 150 LP and 0.2 wt. % pour depressant at dispersant levels of 5 wt. % and 10 wt. %. The noted viscosity measurements were then taken. The results are shown in Table III. The units of viscosity are centipoise.

TABLE III

| | VISCOSITIES | | | | | |
|---|---|---|---|---|---|---|
| | 5 wt. % dispersant | | | 10 wt. % dispersant* | | |
| Dispersant (Ex. No.) | PIB ($M_n$) | KV (cP) | CCS (cP) | PIB ($\overline{M}_n$) | KV (cP) | CCS (cP) |
| 1(a) | 1,300 | 6.14 | 2,966 | 1,300 | 7.18 | 4,047 |
| 1(b) | 1,300 | 6.09 | 2,867 | 1,300 | 7.18 | 3,730 |
| 2(a) | 1,700 | 6.42 | 3,116 | 1,700 | 7.89 | 4,572 |
| 2(b) | 1,700 | 6.42 | 3,014 | 1,700 | 7.96 | 4,254 |
| 3(a) | 1,900 | 6.53 | 3,170 | 1,900 | 7.92 | 4,551 |
| 3(b) | 1,900 | 6.47 | 3,022 | 1,900 | 8.10 | 4,356 |
| 4(a) | 2,250 | 6.64 | 3,245 | 2,250 | 8.49 | 4,901 |
| 4(b) | 2,250 | 6.58 | 3,116 | 2,250 | 8.59 | 4,638 |

*The dispersants were mixed with S150N lubricating oil and 0.2 wt. % of a commercial pour point depressant.

Moreover, a substantial benefit is gained at lower temperatures through the use of these materials.

Finally, the dispersants of this invention were mixed in standard 10W30 and 5W30 motor oil formulations.

TABLE IV

| | VISCOSITY (cP) | | | |
|---|---|---|---|---|
| | 10W30 Form. | | 5W30 Form. | |
| Dispersant | 100° C. | −20° C. | 100° C. | −20° C. |
| Ex. 4(a) Comparative | 10.42 | 3400 | 10.46 | 3653 |
| Ex. 4(b) | 10.31 | 3209 | 10.52 | 3436 |
| Ex. 4(c) | 10.46 | 3296 | 10.56 | 3505 |

The invention has been described by specific disclosure and by examples. It will be apparent to those skilled in the art that various changes and modifications to the claimed invention may be made which fall into the scope of equivalents.

We claim as our invention:

1. A fuel composition containing a dispersant effective amount of an adduct of the formula:

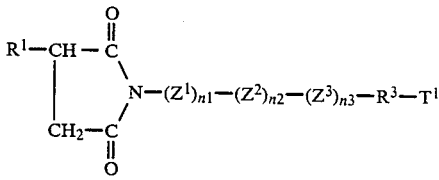

wherein $Z^1$ and $Z^3$ are the same or different and are moieties of the formula:

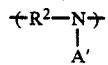

$Z^2$ is a moiety of the formula:

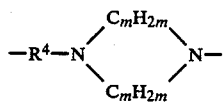

wherein $R^2$, $R^3$ and $R^4$ are the same or different and are alkylene of from 1 to 6 carbon atoms, m is an integer of from 1 to 5, each A' is independently selected from the group consisting of H, A and the moiety:

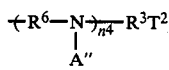

wherein A" is H or A, $R^3$ is as defined above, $R^6$ is alkylene of from 1 to 6 carbon atoms, $T^1$ and $T^2$ are the same or different and each comprises a member selected from the group consisting of moieties of the formula:

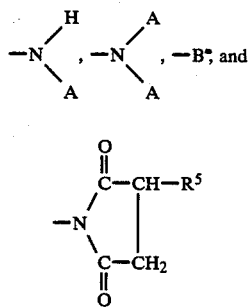

wherein B' is substituted or unsubstituted alkyl or aryl-containing group, $n^1$ is an integer of 0 to 10, $n^2$ is an integer of 0 to 10, $n^3$ is an integer of from 0 to 10, $n^4$ is an integer of from 0 to 10, with the provisos that the sum or $n^1$, $n^2$, $n^3$ and $n^4$ is from 3 to 10 and the sum of $n^1$, $n^3$ and $n^4$ is at least 1, wherein $R^1$ and $R^5$ are independently an olefin polymer having a number average molecular weight ($\overline{m}_n$) between about 650 and 3,500, and wherein A comprises a tautomeric substituent of the formula:

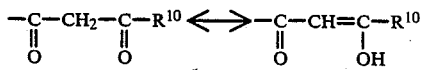

wherein $R^{10}$ is substituted or unsubstituted alkyl or aryl containing groups, with the proviso that at least one of the A' or A" groups comprises said tautomeric substituent, wherein at least about 95% of $T^1$ and $T^2$ groups in said adduct dispersant comprise said succinimide moiety of the formula:

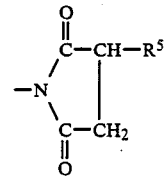

wherein $R^5$ is as defined above.

2. The composition of claim 1 wherein $R^1$ and $R_3$ are polyisobutylene.

3. The composition of claim 2 wherein the polyisobutylene has a $\overline{M}_n$ between about 800 and about 3000.

4. The composition of claim 3 wherein the polyisobutylene has a $\overline{M}_n$ between about 900 and about 2300.

5. The composition of claim 2 wherein $R^2$, $R^4$ and $R^6$ are alkylene of from 2 to 4 carbon atoms.

6. The composition of claim 5 wherein $R^2$, $R^4$ and $R^6$ are $-CH_2CH_2-$.

7. The composition of claim 2 wherein $n^2$ is zero and the sum of $n^1$, $n^3$ and $n^4$ is from 3 to 7.

8. The composition of claim 6 wherein $n^2$ is zero and the sum of $n^1$, $n^3$ and $n^4$ is from 3 to 7.

9. The composition of claim 1 wherein $R^{10}$ is a methyl group.

10. The composition of claim 2 wherein $R^{10}$ is a methyl group.

11. The composition of claim 6 wherein $R^{10}$ is a methyl group.

12. The composition of claim 8 wherein $R^{10}$ is a methyl group.

13. The composition of claim 1 also containing an overbased alkaline earth metal sulfonate detergent material, an overbased alkaline earth metal phenate detergent material or a mixture thereof.

14. The composition of claim 13 wherein the alkaline earth metal is calcium.

15. The composition of claim 13 wherein the alkaline earth metal is magnesium.

16. The composition of claim 1 also containing a friction modifier material.

17. The composition of claim 1 wherein said fuel composition comprises a normally liquid petroleum fuel containing said adduct.

18. The composition of claim 1 wherein said fuel composition comprises gasoline containing said adduct.

19. The composition of claim 1 wherein said fuel composition comprises middle distillates selected from kerosene, diesel fuel, home heating fuel oil and jet fuel containing said adduct.

20. The composition of claim 1 wherein said adduct is present in a concentration of from about 0.001 to 0.1 wt. % in said fuel composition.

21. The composition of claim 17 wherein said adduct is present in a concentration of from about 0.001 to 0.1 wt. % in said fuel composition.

22. The composition of claim 18 wherein said adduct is present in a concentration of from about 0.001 to 0.1 wt. % in said fuel composition.

23. The composition of claim 19 wherein said adduct is present in a concentration of from about 0.001 to 0.1 wt. % in said fuel composition.

24. The composition of any of claims 17 to 23 wherein $R^{10}$ is a methyl group.

25. The composition of claim 24 wherein $R^1$ and $R^3$ are polyisobutylene.

26. The composition of claim 25 wherein the polyisobutylene has a $\overline{M}_n$ between about 800 and about 3,000.

27. The composition of claim 24 wherein $R^2$, $R^4$ and $R^6$ are alkylene of from 2 to 4 carbon atoms.

28. The composition of claim 25 wherein $R^2$, $R^4$ and $R^6$ are $-CH_2CH_2-$.

29. An oleaginuous composition comprising:
a fuel oil;
detergent material; and
a dispersant effective amount of mixtures of adducts having the formulae:

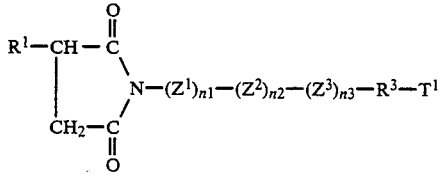

wherein $Z^1$ and $Z^3$ are the same or different and are moieties of the formula:

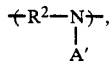

$Z^2$ is a moiety of the formula:

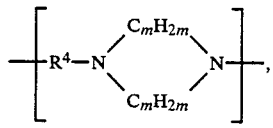

wherein $R^2$, $R^3$ and $R^4$ are the same or different and are alkylene of from about 1 to 6 carbon atoms, m is an integer of from 1 to 5, each A' is independently selected from the group consisting of H, A and the moiety:

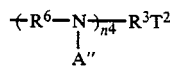

wherein A" is H or A, $R^3$ is as defined above, $R^6$ is alkylene of from 1 to 6 carbon atoms, $T^1$ and $T^2$ are the same or different and each comprises a member selected from the group consisting of moieties of the formula:

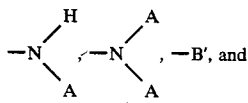

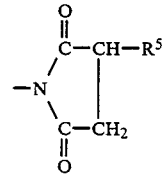

wherein B' is substituted or unsubstituted alkyl or aryl-containing group, $n^1$ is an integer of 0 to 10, $n^2$ is an integer of 0 to 10, $n^3$ is an integer of from 0 to 10, $n^4$ is an integer of from 0 to 10, with the provisos that the sum of $n^1$, $n^2$, $n^3$ and $n^4$ is from 3 to 10 and the sum of $n^1$, $n^3$ and $n^4$ is at least 1, wherein $R^1$ and $R^5$ are independently an olefin polymer having a number average molecular weight ($\overline{M}_n$) between about 650 and 3,500, and wherein A comprises a tautomeric substituent of the formula:

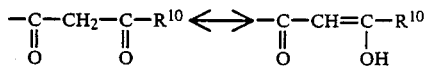

wherein $R^{10}$ is substituted or unsubstituted alkyl or aryl containing groups, with the proviso that at least one of the A' or A" groups comprises said tautomeric substituent, wherein at least about 95% of $T^1$ and $T^2$ groups in adduct dispersants comprise said succinimide moiety of the formula:

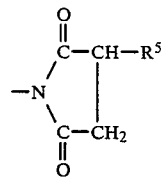

wherein $R^5$ is as defined above.

30. The composition of claim 29 also containing a zinc dihydrocarbyl dithiophosphate in an antiwear effective amount.

31. The composition of claim 30 wherein $R^1$ and $R^5$ are polyisobutylene.

32. The composition of claim 31 wherein the polyisobutylene has a $\overline{M}_n$ between about 800 and about 3000.

33. The composition of claim 32 wherein the polyisobutylene has a $\overline{M}_n$ between about 900 and about 2300.

34. The composition of claim 31 wherein $R^2$, $R^4$ and $R^6$ are alkylene of from 2 to 4 carbon atoms.

35. The composition of claim 34 wherein $R^2$, $R^4$ and $R^6$ are $-CH_2CH_2-$.

36. The composition of claim 32 wherein $n^2$ is zero and the sum of $n^1$, $n^3$ and $n^4$ is from 3 to 7.

37. The composition of claim 31 wherein $n^2$ is zero and the sum of $n^1$, $n^3$ and $n^4$ is from 3 to 7.

38. The composition of claim 30 wherein $R^{10}$ is a methyl group.

39. The composition of claim 31 wherein $R^{10}$ is a methyl group.

40. The composition of claim 35 wherein $R^{10}$ is a methyl group.

41. The composition of claim 37 wherein $R^{10}$ is a methyl group.

42. The composition of claim 30 wherein the detergent material is an overbased alkaline earth metal sulfonate, an overbased alkaline earth metal phenate or a mixture thereof.

43. The composition of claim 42 wherein the alkaline earth metal is calcium.

44. The composition of claim 42 wherein the alkaline earth metal is magnesium.

45. The composition of claim 30 containing a major amount of said fuel oil.

46. The composition of claim 30 also containing a friction modifier material.

* * * * *